US010713870B2

(12) United States Patent
Tamane et al.

(10) Patent No.: US 10,713,870 B2
(45) Date of Patent: Jul. 14, 2020

(54) WIRELESS COMMUNICATION SYSTEM (71) Applicants: Toyota Jidosha Kabushiki Kaisha, Toyota-shi, Aichi-ken (JP); Nomura Research Institute, Ltd., Tokyo (JP); Kabushiki Kaisha Tokai Rika Denki Seisakusho, Niwa-gun, Aichi (JP)

(72) Inventors: Yasuyuki Tamane, Miyoshi (JP); Tsukasa Takahashi, Tokyo (JP); Masaki Oshima, Aichi-ken (JP)

(73) Assignees: Toyota Jidosha Kabushiki Kaisha, Toyota-shi, Aichi-ken (JP); Nomura Research Institute, Ltd., Tokyo (JP); Kabushiki Kaisha Tokai Rika Denki Seisakusho, Niwa-gun, Aichi (JP)

( * ) Notice: Subject to any disclaimer, the term of this patent is extended or adjusted under 35 U.S.C. 154(b) by 0 days.

(21) Appl. No.: 16/134,479

(22) Filed: Sep. 18, 2018

(65) Prior Publication Data
US 2019/0122467 A1    Apr. 25, 2019

(30) Foreign Application Priority Data
Oct. 23, 2017 (JP) .................. 2017-204765

(51) Int. Cl.
*H02J 50/10* (2016.01)
*H02J 50/40* (2016.01)
(Continued)

(52) U.S. Cl.
CPC .......... *G07C 9/00309* (2013.01); *B60R 16/03* (2013.01); *B60R 25/245* (2013.01);
(Continued)

(58) Field of Classification Search
CPC ...... G07C 2009/00515; G07C 2209/63; G07C 9/00309; G07C 2009/00396;
(Continued)

(56) References Cited

U.S. PATENT DOCUMENTS 4,131,304 A * 12/1978 Wagner ............... F02N 11/0811
                                                        123/179.2
6,164,101 A * 12/2000 Kito ........................ B60R 25/24
                                                        70/278.3
(Continued)

FOREIGN PATENT DOCUMENTS

JP    2004-242138 A    8/2004
JP    2006118122 A     5/2006

*Primary Examiner* — Dionne Pendleton
(74) *Attorney, Agent, or Firm* — Dinsmore & Shohl LLP (57) ABSTRACT A wireless communication system includes: a locking and unlocking device configured to control locking and unlocking of a target, the locking and unlocking device including a device-side communication module configured to communicate a first signal having a first frequency band; and a key unit configured to command the locking and unlocking of the target by communicating with the locking and unlocking device. The key unit includes a unit-side communication module that communicates the first signal. The key unit is installed in the target such that a distance between the unit-side communication module and the device-side communication module is within a predetermined distance at which communication between the unit-side communication module and the device-side communication module is possible and that an axis of the unit-side antenna coil of the unit-side communication module is parallel to the axis of the device-side antenna coil.

9 Claims, 9 Drawing Sheets (51) Int. Cl.
*H02J 7/02* (2016.01)
*E05B 35/14* (2006.01)
*G07C 9/00* (2020.01)
*B60R 25/24* (2013.01)
*E05B 11/00* (2006.01)
*B60R 16/03* (2006.01)
*E05B 19/00* (2006.01)

(52) U.S. Cl.
CPC ............ *E05B 11/005* (2013.01); *E05B 19/00* (2013.01); *E05B 35/14* (2013.01); *G07C 2009/0088* (2013.01); *G07C 2009/00515* (2013.01); *G07C 2209/63* (2013.01)

(58) Field of Classification Search
CPC ...... G07C 2009/00555; G07C 9/00119; G07C 2009/00769; G07C 2009/0088; G07C 9/00944; G07C 9/29; B60R 25/24; B60R 2325/205; B60R 25/245; B60R 25/248; E05B 49/00; E05B 19/00; E05B 19/04; E05B 35/14; H01Q 1/3241; H04Q 9/00; H04W 4/023; H04B 7/00; Y10T 70/7079; Y10T 70/7802; Y10T 70/7876
See application file for complete search history.

(56) References Cited

U.S. PATENT DOCUMENTS

| | | | |
|---|---|---|---|
| 2008/0068128 A1* | 3/2008 | Ghabra | B60R 25/245 340/5.61 |
| 2017/0207657 A1* | 7/2017 | Kotani | H02J 7/025 |
| 2018/0234797 A1* | 8/2018 | Ledvina | B60R 25/24 |
| 2019/0147678 A1* | 5/2019 | Saiki | B60R 25/24 |

\* cited by examiner

WIRELESS COMMUNICATION SYSTEM

CROSS-REFERENCE TO RELATED APPLICATIONS

This application claims priority to Japanese Patent Application No. 2017-204765 filed on Oct. 23, 2017, which is incorporated herein by reference in its entirety including the specification, drawings and abstract.

BACKGROUND

1. Technical Field

The disclosure relates to a wireless communication system.

2. Description of Related Art

A key management system is known, in which authentication information for unlocking a vehicle is acquired by a portable terminal from a server device via a network and the portable terminal can be used as an electronic key (Japanese Unexamined Patent Application Publication No. 2006-118122 (JP 2006-118122 A)). In the system, the vehicle has means for reading an integrated circuit (IC) tag, and unlocking is performed using the portable terminal and the IC tag in which key information is written.

In Japanese Unexamined Patent Application Publication No. 2004-242138 (JP 2004-242138 A), a technology is disclosed, for a navigation device for a vehicle on which a VICS (registered trademark) receiver and a wireless communication device different from the VICS receiver are mounted, in which mounting positions of the two wireless communication devices are very close, and radio wave interference of wireless communication by the wireless communication devices is suppressed.

SUMMARY

Vehicles on sale have smart key systems. The smart key system is a system which gives an identifier (ID) unique to a portable device (electronic key) that performs wireless communication with a vehicle, and in which a locking and unlocking device of the vehicle performs door unlocking or the like in a case where the ID obtained by the communication matches an ID registered in the vehicle in advance. Locking and unlocking of the vehicle by a portable terminal using the smart key system is being studied, and a system that enables the locking and unlocking of the vehicle by the portable terminal without remodeling the vehicle is being studied.

For example, a key unit having a role of the electronic key (hereinafter, may be simply referred to as "key unit") is installed in the vehicle and the key unit communicates with the locking and unlocking device of the vehicle based on the result of an authentication performed on the portable terminal such as a smart phone. By doing as described above, it is possible to control the locking and unlocking of the vehicle by the portable terminal without remodeling the vehicle.

Here, when the key unit is installed in a target such as the vehicle (hereinafter simply referred to as "target"), and in a case where the key unit is installed in a position or an orientation where a communication defect with the locking and unlocking device occurs, the locking and unlocking of the vehicle by the portable terminal may not be possible.

The related art discloses methods to suppress radio wave interference, and there is still a room for improvement in maintaining good communication between the key unit and the locking and unlocking device.

The disclosure provides a wireless communication system including a locking and unlocking device of a target, and a key unit that controls locking and unlocking of the target, in which an intensity of a wireless communication between the key unit and the locking and unlocking device is increased as much as possible.

The key unit controls locking and unlocking of a target by communicating with a locking and unlocking device. Each of the key unit and the locking and unlocking device includes a communication module, and thus a wireless communication system in which communication is performed between the communication modules is configured.

An aspect of the disclosure relates to a wireless communication system. The wireless communication system includes: a locking and unlocking device configured to control locking and unlocking of a target, the locking and unlocking device including a device-side communication module configured to communicate a first signal having a first frequency band; and a key unit configured to communicate with the locking and unlocking device and to command the locking and unlocking of the target by communicating with the locking and unlocking device, the key unit being installed in the target. The key unit includes a unit-side communication module that communicates the first signal.

The device-side communication module has a device-side antenna coil for communication. The unit-side communication module has a unit-side antenna coil for communication. The antenna coil has directivity, for example, in a case where radio waves are transmitted from the antenna coil, a field intensity becomes relatively strong in an axial direction of the antenna coil. On the other hand, in a case where the radio waves are received by the antenna coil, when a direction of the radio waves is parallel to an axis of the antenna coil (in the specification, implication of "parallel" includes "substantially parallel"), a reception intensity becomes relatively strong.

The key unit is installed in the target such that a distance between the unit-side communication module and the device-side communication module is within a predetermined distance at which communication between the unit-side communication module and the device-side communication module is possible and that an axis of the unit-side antenna coil is parallel to an axis of the device-side antenna coil. According to the configuration, it is possible to increase the intensity of wireless communication between the key unit and the locking and unlocking device as much as possible. Then, even when a noise source is present around the key unit, signal-to-noise ratio can be maintained relatively high, and thus good wireless communication between the key unit and the locking and unlocking device can be realized. In a case where the key unit is installed in a position away from the noise source, better wireless communication can be realized.

According to the aspect of the disclosure, the aspect can be suitably applied to an embodiment in which the locking and unlocking of the vehicle is controlled by using an existing smart key system.

In the wireless communication system according to the aspect of the disclosure, the device-side communication module may be a device-side transmission module that is configured to transmit the first signal to the key unit. The unit-side communication module may be a unit-side reception module that is configured to receive the first signal. The key unit may further include a unit-side transmission module configured to transmit a second signal having a second frequency band that is a frequency band higher than the first frequency band to the locking and unlocking device. The locking and unlocking device may further include a device-side reception module which is configured to receive the second signal, and is mounted on a vehicle. The key unit may be configured to transmit the second signal that commands the locking and unlocking of the vehicle from the unit-side transmission module when the unit-side reception module receives the first signal. The locking and unlocking device may be configured to control the locking and unlocking of the vehicle when the device-side reception module receives the second signal.

As described above, in a case where the target is the vehicle, the locking and unlocking device is specified as the locking and unlocking device of the vehicle, and the key unit is installed in the vehicle. Here, since a plurality of noise sources (for example, ETC (registered trademark) in-vehicle device, air conditioner, wiper, and plasmacluster) may be present in the vehicle, unless the key unit is installed in an appropriate position or orientation in the vehicle, there may be a communication defect between the key unit and the locking and unlocking device due to the noise or radio wave interference. In the aspect in which the key unit is installed in the vehicle, the key unit is installed in the vehicle such that the axis of the unit-side antenna coil is parallel to the axis of the device-side antenna coil. As described above, it is possible to increase the intensity of the wireless communication between the key unit and the locking and unlocking device as much as possible.

Here, in the key unit using the smart key system, a command signal (response signal) is transmitted to the locking and unlocking device in a manner of responding to a polling (checking) signal from a vehicle side. That is, as described above, when the unit-side communication module receives the first signal (polling signal), the key unit transmits the second signal (response signal) from the unit-side transmission module to command the locking and unlocking of the vehicle. Then, when the device-side reception module receives the second signal (response signal), the locking and unlocking device controls the locking and unlocking of the vehicle.

The key unit may include a power supply circuit, and in a case where the key unit including the power supply circuit is installed in the vehicle, the key unit is installed in a position where an uninterruptible power supply to the key unit is possible even in a state in which a system power of the vehicle is turned off. Furthermore, the key unit is installed in a position where the key unit can be appropriately fixed to the vehicle. As described above, the key unit is fixed to the vehicle even when the vehicle is traveling or another device (for example, airbag) provided in the vehicle is operating, and thus it is possible to protect occupants in the vehicle or reduce damage to the key unit.

In the wireless communication system according to the aspect of the disclosure, the key unit may be installed in a vehicle cabin of the vehicle. Here, the device-side communication module of the locking and unlocking device of the vehicle tends to be built in a position (for example, center console or instrument panel) where the first signal (polling signal) from the device-side communication module can reach inside the vehicle cabin. Therefore, by installing the key unit in the vehicle cabin of the vehicle (for example, in a center console, in a glove compartment, under a seat, or on a ceiling), it is possible to increase the intensity of the wireless communication between the key unit and the locking and unlocking device as much as possible. Since people who can access the inside of the vehicle cabin are limited to specific persons, by installing the key unit in the vehicle cabin, it is possible to reduce theft of the key unit and to reduce mischief to the key unit.

In the wireless communication system according to the aspect of the disclosure, the unit-side antenna coil may have one axis. According to the configuration as described above, since influence of the noise is suppressed as much as possible, better wireless communication between the key unit and the locking and unlocking device can be realized.

In the wireless communication system according to the aspect of the disclosure, the locking and unlocking device may be installed in an instrument panel of the vehicle.

In the wireless communication system according to the aspect of the disclosure, the key unit and the locking and unlocking device may be installed in a center console of the vehicle.

In the wireless communication system according to the aspect of the disclosure, the key unit and the locking and unlocking device may be installed in an instrument panel of the vehicle.

In the wireless communication system according to the aspect of the disclosure, the first frequency band may be a long wave band. According to the above description, the aspect of the disclosure can be suitably applied to a system that performs the wireless communication by the radio waves in the long wave band (30 kHz to 300 kHz).

The aspect of the disclosure can be specified as a locking and unlocking system including the wireless communication system. Processing and the structure can be freely combined and implemented without technical inconsistency.

According to the aspect of the disclosure, it is possible to increase the intensity of wireless communication between the key unit and the locking and unlocking device as much as possible.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Outline of Locking and Unlocking System

Figure 1:
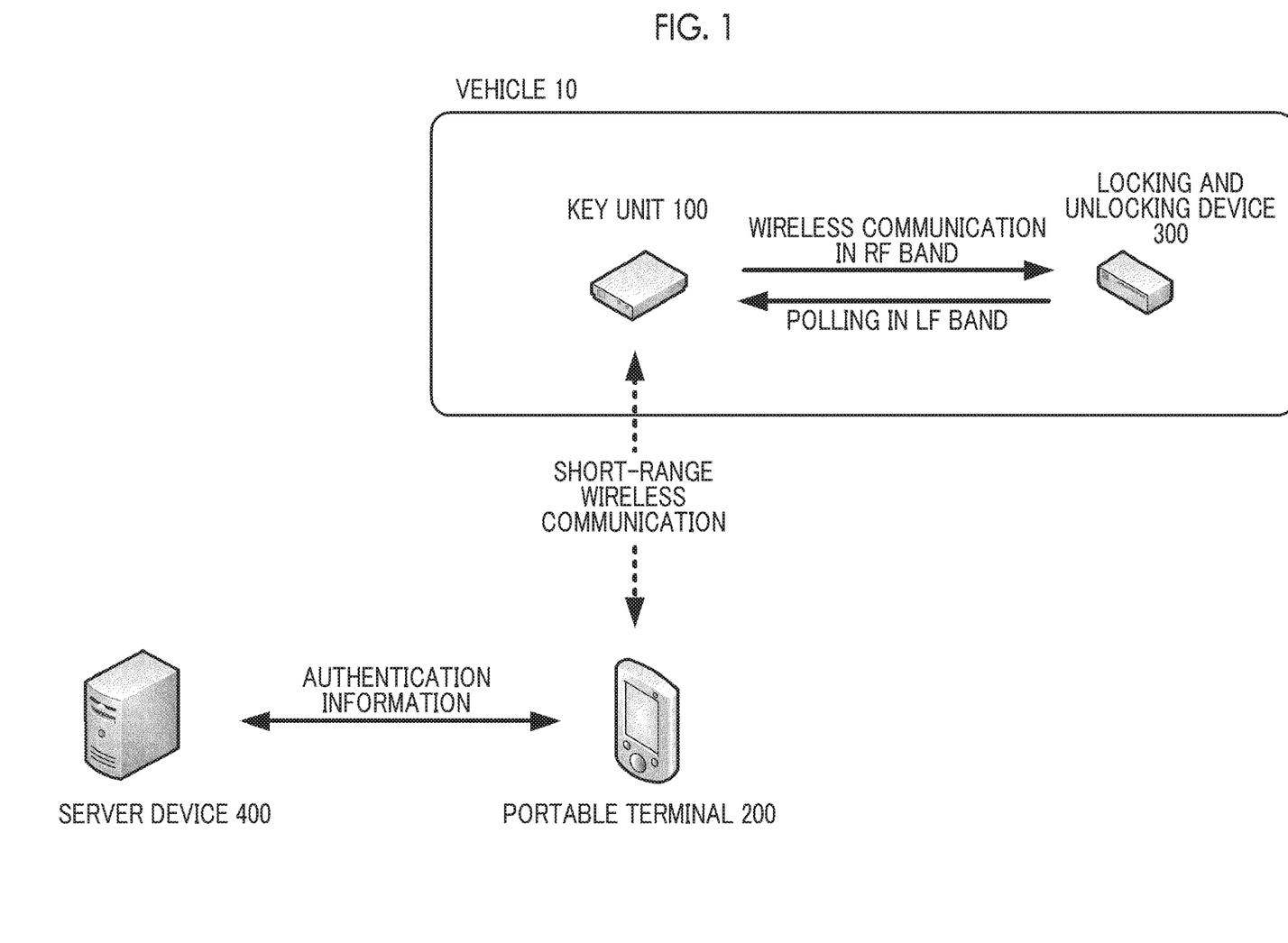
FIG. 1 is a system outline diagram of a locking and unlocking system according to an embodiment.

An outline of a locking and unlocking system according to the embodiment will be described with reference to FIG. 1. The locking and unlocking system according to the first embodiment is configured to include a key unit 100 and a locking and unlocking device 300 mounted on a vehicle 10, a portable terminal 200, and a server device 400. In the locking and unlocking system according to the first embodiment, the key unit 100 has the same wireless interface as an electronic key (portable device) of a smart key, and it is possible to control locking and unlocking of the vehicle without using a physical key by communicating with the existing locking and unlocking device 300. The key unit 100 performs short-range wireless communication with the portable terminal 200 and determines whether or not the key unit 100 plays a role of an electronic key of the vehicle 10 based on the result of authenticating the portable terminal 200. That is, a user can control the locking and unlocking of the vehicle by manipulating the portable terminal 200 from the outside of the vehicle 10.

Configuration of Locking and Unlocking System

Figure 2:
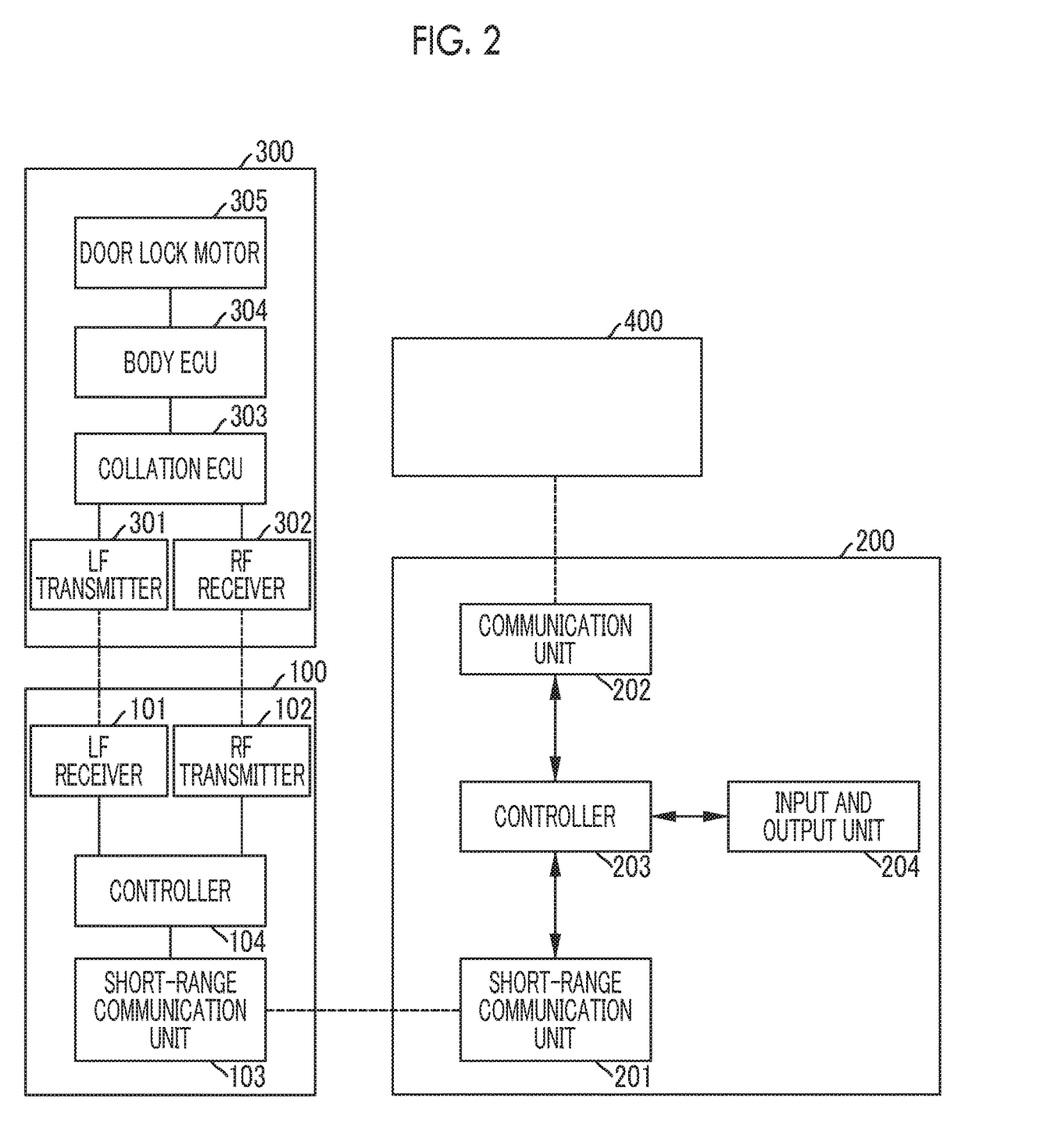
FIG. 2 is a block diagram schematically showing an example of components of the locking and unlocking system.

Components of the locking and unlocking system will be described in detail. FIG. 2 is a block diagram schematically showing an example of the configuration of the key unit 100, the portable terminal 200, the locking and unlocking device 300, and the server device 400 shown in FIG. 1. Among the components of the locking and unlocking system, the key unit 100 and the locking and unlocking device 300 are mounted on the vehicle 10 which is a target of locking and unlocking (to be locked and to be unlocked).

The locking and unlocking device 300 is a device locking and unlocking a door of the vehicle, and is an existing device constituting a part of a smart key system. Specifically, the door of the vehicle 10 is locked and unlocked according to a locking signal and an unlocking signal transmitted from a portable device which is the electronic key of the vehicle (in the related art, portable device is possessed by the user of the vehicle) via the radio waves in a high frequency (radio frequency, hereinafter referred to as RF) band. A function of transmitting the radio waves in a low frequency (hereinafter referred to as LF) band for checking the portable device is included.

In the first embodiment, the key unit 100 mounted on the vehicle 10 transmits and receives the radio waves in the RF band and the LF band instead of the portable device possessed by the user so as to control the locking and unlocking of the door of the vehicle. Hereinafter, unless otherwise noted, a description will be made with a communication destination of the locking and unlocking device 300 being limited to the key unit 100.

The locking and unlocking device 300 is configured to include an LF transmitter 301, an RF receiver 302, a collation ECU 303, a body ECU 304, and a door lock motor 305. The locking and unlocking device 300 operates by power supplied from an auxiliary battery (not shown) mounted on the vehicle 10. The LF transmitter 301 is function as a device-side communication module or a device-side transmission module. The RF receiver 302 is function as a device-side reception module.

The LF transmitter 301 transmits the radio waves in the low frequency band (functions as first frequency band, for example, 100 KHz to 300 KHz) for checking (polling) the key unit 100.

The RF receiver 302 receives the radio waves in the high frequency band (functions as second frequency band. For example, 100 MHz to 1 GHz) transmitted from the key unit 100. The RF receiver 302 is built in any place in the vehicle cabin.

The collation ECU 303 is a computer that performs control to lock and unlock the door of the vehicle 10, based on the signal (locking signal or unlocking signal) transmitted from the key unit 100 via the radio waves in the RF band. The collation ECU 303 is constituted by, for example, a microcomputer. In the following description, the locking signal and the unlocking signal are collectively referred to as the locking and unlocking signals. The term "locking and unlocking signals" represents at least one of the locking signal and the unlocking signal.

Figure 3:
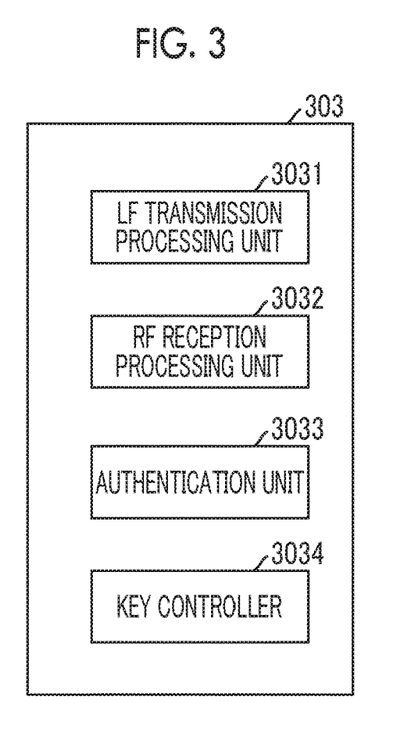
FIG. 3 is an example of functional modules included in a collation electronic control unit (ECU)

FIG. 3 shows functional modules included in a collation ECU 303. Each of the functional modules shown in FIG. 3 may be realized by executing a program stored in storage unit (such as a read only memory (ROM)) by a central processing unit (CPU) (none of which is shown).

An LF transmission processing unit 3031 performs control to transmit a polling signal (function as the first signal) to the inside and outside of the vehicle cabin as the radio waves in the LF band via the LF transmitter 301. An RF reception processing unit 3032 performs control to receive the locking and unlocking signals (function as the second signal) transmitted from the key unit 100 as the radio waves in the RF band via the RF receiver 302. An authentication unit 3033 authenticates whether or not the locking and unlocking signals transmitted from the key unit 100 is transmitted from a legitimate device. Specifically, a determination is made whether or not a key ID included in the locking and unlocking signals matches a key ID stored in advance in the storage unit (not shown) of the collation ECU 303. Specific details will be described later.

A key controller 3034 transmits an unlocking command or a locking command to the body ECU 304, which will be described later, based on the result of the authentication performed by the authentication unit 3033. The signal is transmitted via an in-vehicle network such as a controller area network (CAN).

The body ECU 304 is a computer that controls the body of the vehicle. The body ECU 304 has a function of unlocking and locking the door of the vehicle by controlling a door lock motor 305 described later, based on the received unlocking command or locking command. The body ECU 304 may further have a function of controlling components associated with the vehicle body such as a power window control, a seat adjustment, an anti-theft, a seatbelt control, and a headlight control.

The door lock motor 305 is an actuator that locks and unlocks the door of the vehicle 10 (including a trunk as well as a door for getting on and off and a rear gate). The door lock motor 305 operates based on a signal transmitted from the body ECU 304.

The key controller 3034 may transmit solely information that the authentication is successful to the body ECU 304 instead of the unlocking command or the locking command. According to such a configuration, it is possible to cause the locking or unlocking operation to be performed with the action by the user (for example, pressing of an unlocking button and touching of a door knob) as a trigger.

The key unit 100 will be described. The key unit 100 is a device installed in the vehicle 10, and has a function of authenticating the portable terminal 200 by performing short-range wireless communication with the portable terminal 200, and a function of transmitting the locking and unlocking signals using the radio waves in the RF band, based on the result of authenticating the portable terminal 200. The key unit 100 is configured to include an LF receiver 101, an RF transmitter 102, a short-range communication unit 103, and a controller 104. The LF receiver 101 is function as a unit-side communication module or a unit-side reception module. The RF transmitter 102 is function as a unit-side transmission module.

The LF receiver 101 receives the polling signal transmitted from the locking and unlocking device 300 via the radio waves in the LF band. The LF receiver 101 has an antenna coil that receives the radio waves in the LF band.

The RF transmitter 102 transmits the locking and unlocking signals to the key unit 100 via the radio waves in the RF band.

The short-range communication unit 103 communicates with the portable terminal 200 possessed by the user. The short-range communication unit 103 performs the communication in a short range (to the extent that the communication can be performed inside and outside the vehicle cabin) using a predetermined wireless communication standard.

In the first embodiment, the short-range communication unit 103 performs the data communication by Bluetooth (registered trademark) Low Energy standard (hereinafter referred to as BLE). The BLE is a low power communication standard based on Bluetooth, and can start the communication immediately by detecting a partner without requiring pairing between the devices. In the first embodiment, the BLE is exemplified, but other wireless communication standards can also be used. For example, near-field communication (NFC), ultra-wide band (UWB), or WiFi (registered trademark) can be used.

The controller 104 is a computer that performs the short-range wireless communication with the portable terminal 200 via the short-range communication unit 103, performs control to authenticate the portable terminal 200, and performs control to transmit the locking and unlocking signals based on the authentication result. The controller 104 is constituted by, for example, a microcomputer.

Figure 4:
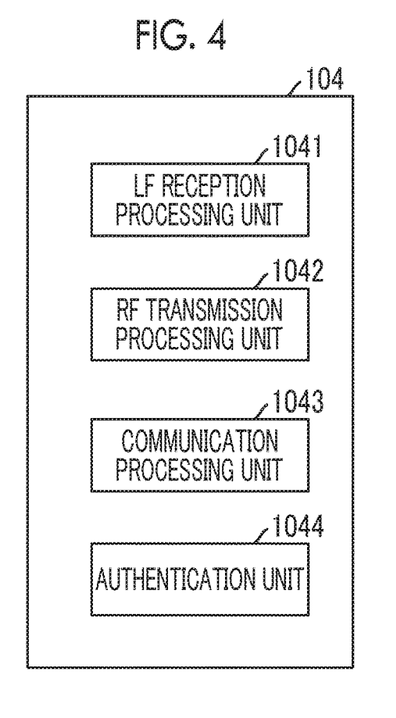
FIG. 4 is an example of functional modules included in a controller.

The functional modules included in the controller 104 are shown in FIG. 4. Each of the functional modules shown in FIG. 4 may be realized by executing the program stored in the storage unit (ROM or the like) by the CPU (none of which is shown).

An LF reception processing unit 1041 performs control to receive the polling signal transmitted from the locking and unlocking device 300 as the radio waves in the LF band via the LF receiver 101. An RF transmission processing unit 1042 performs control to transmit the locking and unlocking signals as the radio waves in the RF band via the RF transmitter 102. The locking and unlocking signals are generated by a communication processing unit 1043 described later, in a case where an authentication unit 1044 described later successfully authenticates the portable terminal 200.

The communication processing unit 1043 processes the communication with the portable terminal 200 via the short-range communication unit 103. Specifically, the communication processing unit 1043 receives a locking request or an unlocking request (hereinafter collectively referred to as locking and unlocking requests) from the portable terminal 200, and generates the locking and unlocking signals according to the received request. The generated locking and unlocking signals are temporarily stored, and are output at a timing when the authentication unit 1044 described later successfully authenticates the portable terminal 200.

The authentication unit 1044 authenticates the portable terminal 200 based on authentication information included in the locking and unlocking requests transmitted from the portable terminal 200. Specifically, the authentication information stored in the storage unit (not shown) is compared with the authentication information transmitted from the portable terminal 200, and in a case where both pieces of the authentication information match, determination is made that the authentication is successful. In a case where both pieces of the authentication information do not match, determination is made that the authentication failed. In a case where the authentication unit 1044 successfully authenticates the portable terminal 200, the locking and unlocking signals generated by the communication processing unit 1043 is output to the RF transmission processing unit 1042, and wirelessly transmitted to the locking and unlocking device 300. An authentication method performed by the authentication unit 1044 may be a method of simply comparing pieces of authentication information to verify the identity or a method using asymmetric encryption. Hereinafter, the authentication information stored in the key unit 100 is referred to as device authentication information, and the authentication information transmitted from the portable terminal 200 is referred to as terminal authentication information, as necessary for description.

In the first embodiment, the authentication unit 1044 is set to generate a transmission trigger of the locking and unlocking signals; however, the authentication unit 1044 may control a power supply of the key unit 100 based on the authentication status. For example, in a situation where authentication of the portable terminal 200 is not performed, all the components except the communication processing unit 1043 and the authentication unit 1044 are set to be in a suspend state, and in a case where the authentication is successful, in a predetermined period (for example, until the response from the locking and unlocking device 300 to the transmitted locking and unlocking signals is made), all the components may be in an energized state. As long as the locking and unlocking signals can be transmitted solely in a case where the authentication is successful, the method to realize the authentication is not limited.

The key unit 100 simultaneously transmits the locking and unlocking signals and the 1D of the electronic key (hereinafter referred to as key ID) to the locking and unlocking device 300. The key ID may be stored in advance in the key unit 100 in a plaintext state or may be stored in a state encrypted by a cryptogram unique to the portable terminal 200. In the case where the key ID is encrypted and stored, by the authentication information transmitted from the portable terminal 200, the encrypted key ID may be decrypted to obtain the original key ID.

The portable terminal 200 will be described. The portable terminal 200 is a small computer such as a smartphone, a mobile phone, a tablet terminal, a personal information terminal, and a wearable computer (smartwatch or the like). The portable terminal 200 is configured to include a short-range communication unit 201, a communication unit 202, a controller 203, and an input and output unit 204.

The short-range communication unit 201 communicates with the key unit 100 according to the same communication standard as the short-range communication unit 103. The communication unit 202 connects the portable terminal 200 to a network. In the first embodiment, it is possible to communicate with the other device (for example, the server device 400) via the network by using a mobile communication service such as Third Generation (3G) and Long Term Evolution (LTE).

The controller 203 is a computer that controls the portable terminal 200. The controller 203 performs, for example, processing of generating the locking and unlocking requests, processing of acquiring the terminal authentication information, and processing of transmitting the locking and unlocking requests and the terminal authentication information to the key unit 100. The controller 203 is constituted by, for example, a microcomputer. The controller 203 may realize the functions such as the processing by executing the program stored in the storage unit (ROM or the like) by the CPU (none of which is shown).

The controller 203 interacts with the user via the input and output unit 204. The input and output unit 204 receives an input manipulation performed by the user and presenting information to the user. Specifically, the input and output unit is constituted by a touch panel, control means of the touch panel, a liquid crystal display, and control unit of the liquid crystal display. In the first embodiment, the touch panel and the liquid crystal display are configured to be a single touch panel display.

The controller 203 displays a manipulation screen on the input and output unit 204, and generates the unlocking request or the locking request based on the manipulation performed by the user. For example, the controller 203 outputs an icon for unlocking, and an icon for locking to the touch panel display, and generates the unlocking request or the locking request based on the manipulation performed by the user. The manipulation performed by the user is not limited to the one via the touch panel display. For example, the manipulation may be a manipulation via a hardware switch.

The controller 203 performs the processing of acquiring the terminal authentication information. In the first embodiment, the terminal authentication information is generated in the server device 400 and transmitted to the portable terminal 200 via the communication unit 202. In a case where the portable terminal 200 does not have the terminal authentication information, the locking manipulation and the unlocking manipulation from the manipulation screen are not possible.

The terminal authentication information acquired by the portable terminal 200 may be for an unchanging key or for a one-time key. In either case, the device authentication information corresponding to the terminal authentication information is stored in advance in the key unit 100.

Outline of Locking and Unlocking Device

Before the detailed description of the operation of the locking and unlocking system, the outline of the operation performed by the locking and unlocking device 300 will be described. The locking and unlocking device 300 is a device constituting a normal smart key system, and in the first embodiment, communicates with the key unit 100 so as to detect that the key unit 100 is inside the vehicle cabin.

More specifically, the collation ECU 303 transmits the polling signal to the inside and outside of the vehicle at a certain period via the LF transmitter 301, and receives a return signal transmitted by the key unit 100 in response to the polling signal. The key ID unique to the key unit 100 is included in the return signal, and the registered key ID of the key unit 100 is stored in the collation ECU 303. The collation ECU 303 performs the authentication processing of the key unit 100 by using the received key ID and the stored key ID. In a case where the key unit 100 is successfully authenticated, the body ECU 304 is notified that the authentication is successful, and it is possible to cause the vehicle to perform a predetermined operation (for example, door unlocking and cancellation of the immobilizer) as the above description.

Here, the work of registering the key ID of the key unit 100 in the locking and unlocking device 300 will be described. The work is performed by a manufacturer or an owner of the vehicle. Here, the flow of the work will be described with reference to FIG. 5.

Figure 5:
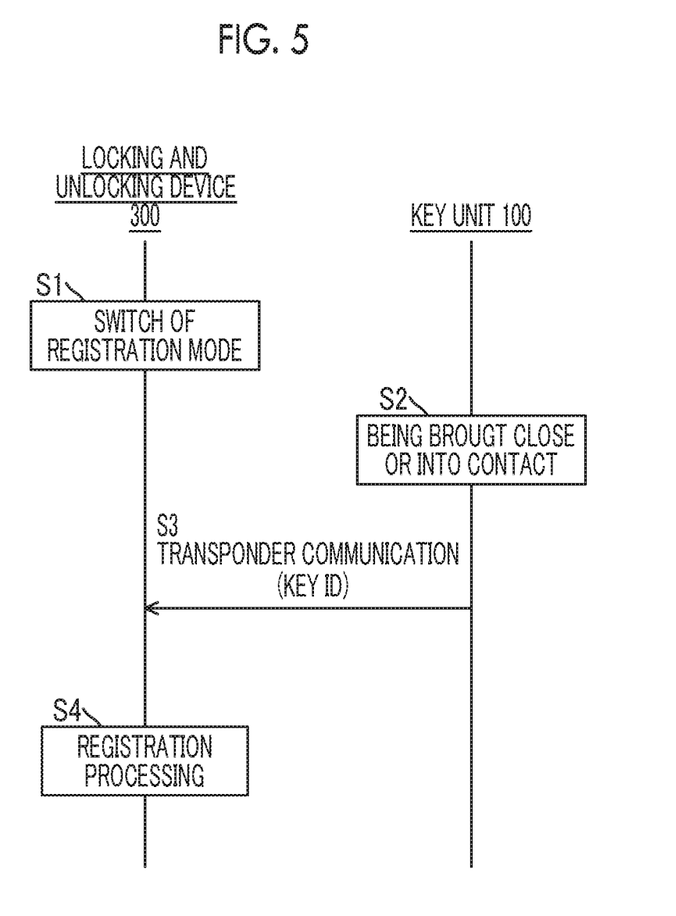
FIG. 5 is a setup flowchart of a key unit.

First, in step S1, the locking and unlocking device 300 switches to a mode for registering a new key ID. At this time, the locking and unlocking device 300 may request communication with the previously registered portable device (that is, portable device having the previously stored key ID). As described above, it is possible to confirm that the person performing the registration work is a legitimate owner of the vehicle.

In step S2, the user brings the key unit 100 close to or substantially into contact with the locking and unlocking device 300. As described above, a signal for registration is supplied from the locking and unlocking device 300 to the key unit 100, and the key unit 100 which detects the signal transmits the key ID to the locking and unlocking device 300 (step S3). The operation is known for the registration of the key ID on a vehicle side in a smart key system for an automobile (commonly referred to as transponder communication). The transmitted key 1D is received by the locking and unlocking device 300 and registered as a valid key ID (step S4). That is, the locking and unlocking device and the key unit are linked.

The communication and the processing performed between the locking and unlocking device 300 and the key unit 100 has been described above.

Operation of Locking and Unlocking System

Figure 6:
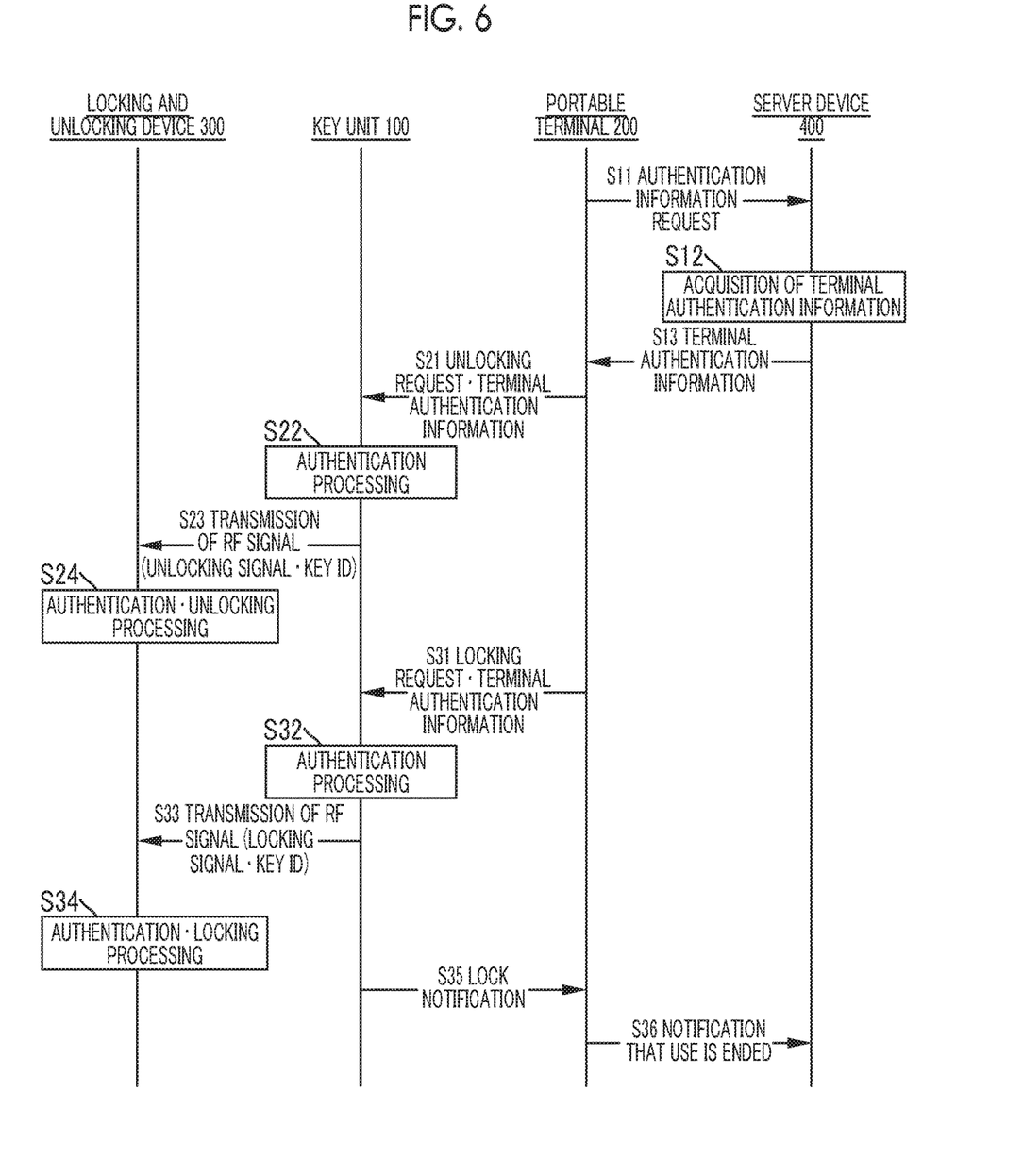
FIG. 6 is a flowchart of data and processing between the components.

The operation of the locking and unlocking system according to the first embodiment will be described with reference to FIG. 6. FIG. 6 is a flowchart for describing the data transmitted and received between the components and the processing performed by each of the components.

First, in step S11, the portable terminal 200 requests the server device 400 to issue terminal authentication information. The terminal authentication information described here is not information for the locking and unlocking device 300 to authenticate the key unit 100, and is information for the key unit 100 to authenticate the portable terminal 200. When the portable terminal 200 transmits the information identifying the terminal to the server device 400, the server device 400 acquires the terminal authentication information unique to the portable terminal 200 (step S12), and transmits the acquired terminal authentication information to the portable terminal 200 (step S13). As described above, it is possible to perform the manipulation of unlocking the vehicle 10 by the portable terminal 200. Since the processing in steps S11 to S13 is preparation processing for controlling of the locking and unlocking, the processing is not particularly limited, and it is useful to perform the processing in advance.

Steps S21 to S24 are processing for unlocking the vehicle 10 using the portable terminal 200. When the user of the portable terminal 200 performs the manipulation to unlock the vehicle 10 via the input and output unit 204, the portable terminal 200 transmits the unlocking request and the terminal authentication information to the server device 400 in step S21. In step S22, the key unit 100 compares the terminal authentication information transmitted from the portable terminal 200 with the device authentication information stored in advance, and performs the authentication processing.

In a case where the authentication succeeds, the key unit 100 transmits the unlocking signal and the key ID to the locking and unlocking device 300 in step S23. Then, in step S24, the locking and unlocking device 300 performs the authentication processing based on the received key ID. As a result, in a case where the authentication succeeds, the door of the vehicle 10 is unlocked. At this time, an answer-back or the like may be performed.

Steps S31 to S36 are processing for locking the vehicle 10 using the portable terminal 200. When the user of the portable terminal 200 performs the manipulation of locking the vehicle 10 via the touch panel screen, the portable terminal 200 transmits the locking request and the terminal authentication information to the server device 400 in step S31. Then, in step S32, the key unit 100 compares the terminal authentication information transmitted from the portable terminal 200 with the device authentication information stored in advance, and performs the authentication processing.

In case of where the authentication succeeds, the key unit 100 transmits the locking signal and a key ID to the locking and unlocking device 300 in step S33. Then, in step S34, the locking and unlocking device 300 performs the authentication processing based on the received key ID. As a result, in a case where the authentication succeeds, the door of the vehicle 10 is locked.

After the transmission of the locking signal, the key unit 100 transmits a notification (lock notification) that the locking is completed to the portable terminal 200 (step S35). As described above, a notification that the locking is completed is output to the touch panel screen of the portable terminal 200. In a case where the authentication information is for a one-time key, the one-time key may be invalidated at the timing of step S35. The portable terminal 200 generates a notification that the use of the system is ended, and transmits the notification to the server device 400 (step S36).

Wireless Communication System

A wireless communication system according to the first embodiment will be described. The wireless communication system according to the first embodiment is defined as a system of the wireless communication performed between the locking and unlocking device 300 and the key unit 100 via the LF transmitter 301 and the LF receiver 101.

As described above, the LF transmission processing unit 3031 included in the collation ECU 303 of the locking and unlocking device 300 transmits the polling signal at a certain cycle via the LF transmitter 301. Then, the key unit 100 receives the polling signal via the LF receiver 101. Here, the polling signal which is the radio wave in the LF band tends to be susceptible to noise. Further, a plurality of noise sources (for example, ETC (registered trademark) in-vehicle device, air conditioner, wiper, and plasmacluster) may be present in the vehicle 10. Therefore, unless the key unit 100 is installed in an appropriate position or orientation in the vehicle 10, there is a possibility that the LF receiver 101 cannot appropriately receive the polling signal due to the noise or radio wave interference.

Figure 7:
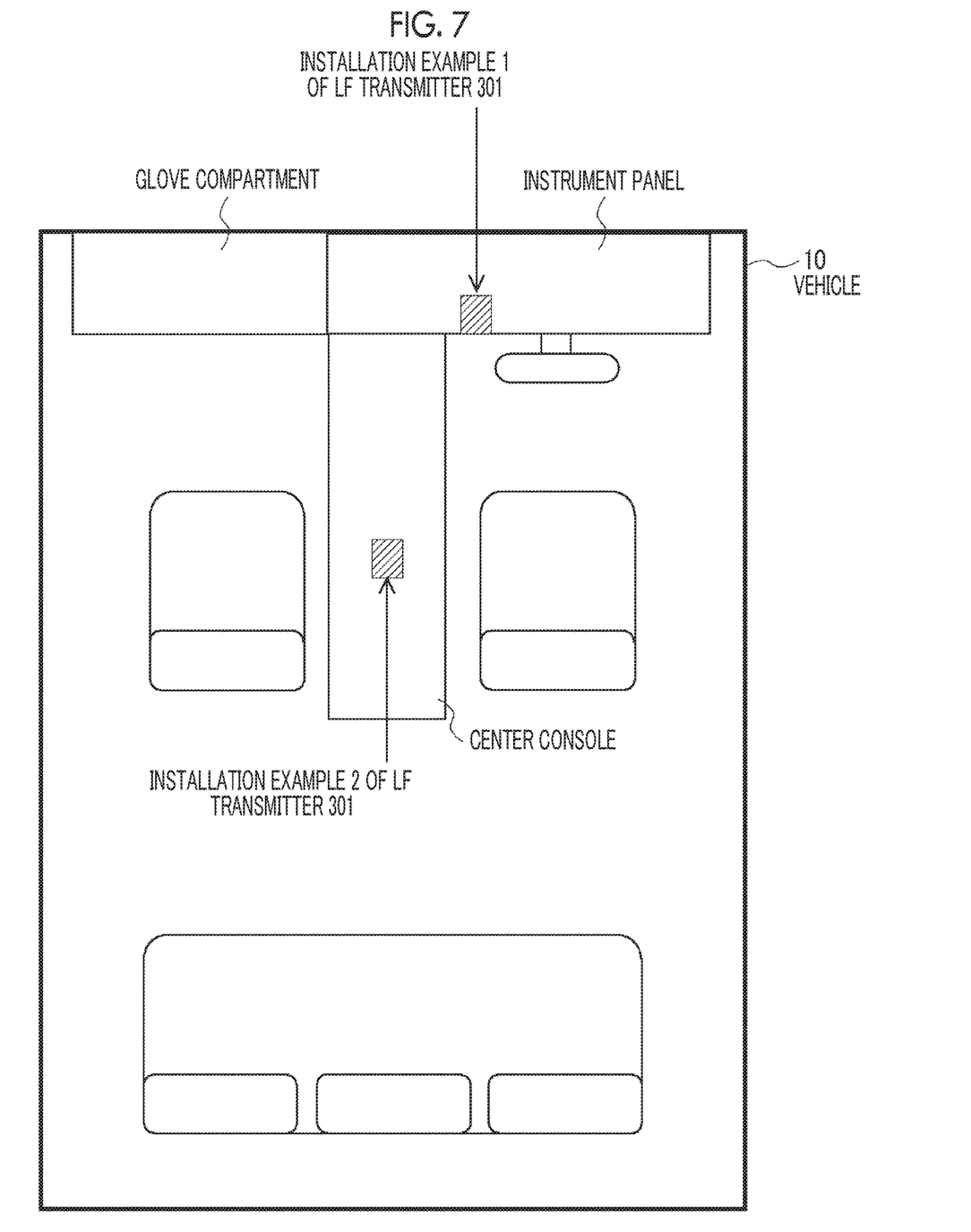
FIG. 7 is a diagram showing a mounting example of a low frequency (LF) transmitter.
Figure 8:
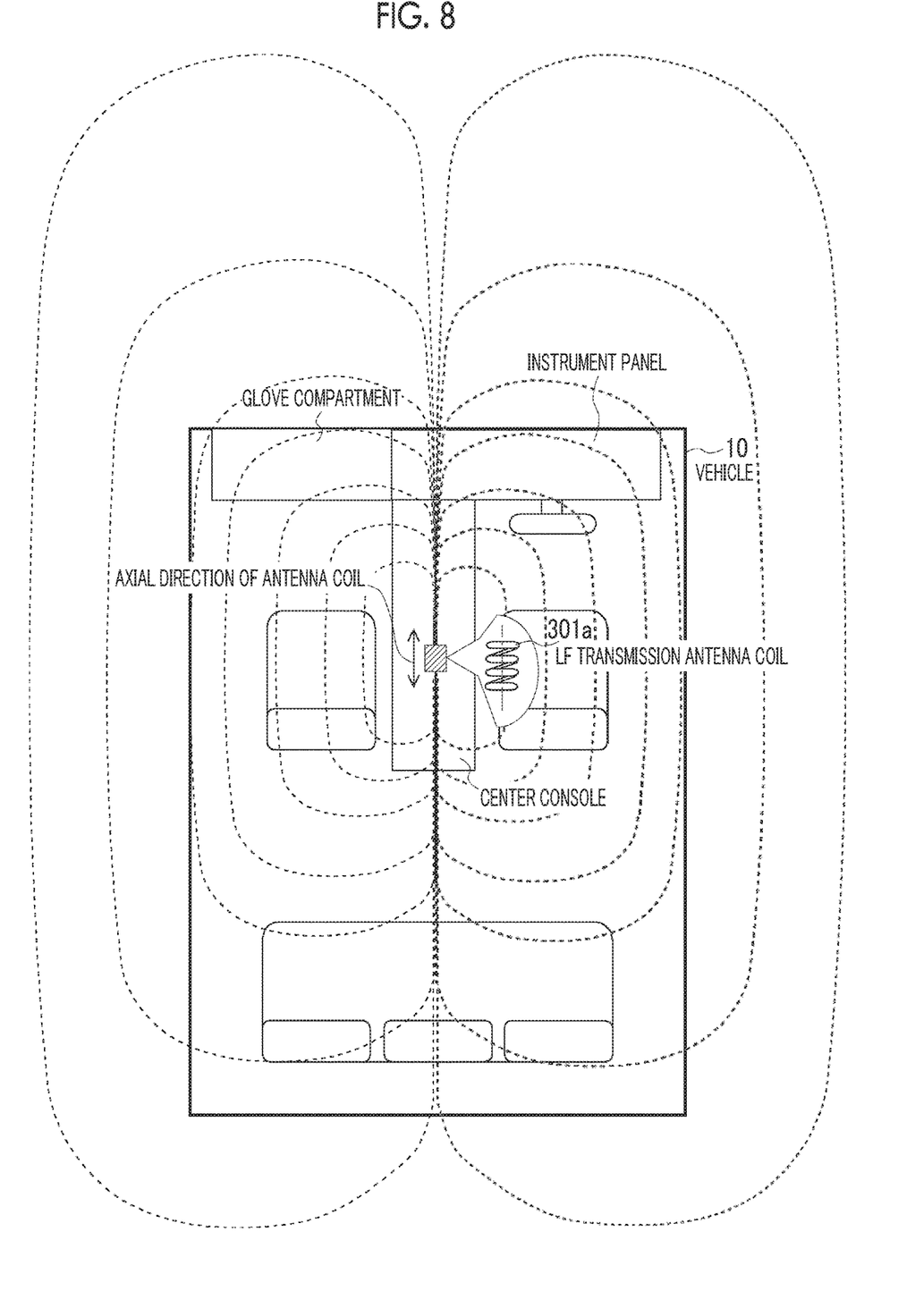
FIG. 8 is a diagram schematically showing radio waves transmitted from an LF transmission antenna coil.

As shown in FIG. 7, the LF transmitter 301 of the locking and unlocking device 300 is built in a center console or an instrument panel of the vehicle 10. Here, the LF transmitter 301 has an LF transmission antenna coil 301a that transmits the radio waves in the LF band. The radio waves transmitted from the LF transmission antenna coil 301a have directivity, and a field intensity in the axial direction of the antenna coil becomes relatively strong. FIG. 8 is a diagram schematically showing the radio waves transmitted from the LF transmission antenna coil 301a in a case where the LF transmitter 301 is built in the center console. As shown in FIG. 8, a radiation characteristic of the radio waves transmitted from the LF transmission antenna coil 301a is a radiation in a donut shape around the antenna coil. Therefore, as described above, the field intensity in the axial direction of the antenna coil becomes relatively strong.

In the wireless communication system according to the first embodiment, the key unit 100 is installed in the vehicle 10 such that a distance between the LF receiver 101 of the key unit 100 and the LF transmitter 301 of the locking and unlocking device 300 is within a predetermined distance at which communication between LF receiver 101 and the LF transmitter 301 is possible and that an axis of an LF reception antenna coil 101a of the LF receiver 101 is parallel to an axis of the LF transmission antenna coil 301a. In the first embodiment, the key unit 100 is installed in the vehicle cabin. This is because the polling signal transmitted from the LF transmission antenna coil 301a tends to reach the entire area inside the vehicle cabin, and when the key unit 100 is installed in the vehicle cabin, good communication between LF receiver 101 and the LF transmitter 301 is possible.

Furthermore, by installing the key unit 100 in the vehicle cabin, it is possible to reduce theft of the key unit 100 and to reduce mischief to the key unit 100. This is because people who can access the inside of the vehicle cabin are limited to specific persons.

On the other hand, in the wireless communication system according to the first embodiment of the disclosure, there is no intention to limit the installation of the key unit 100 in the vehicle cabin, as described above, as long as the key unit 100 is installed in the vehicle 10 such that the distance between the LF receiver 101 and the LF transmitter 301 is within the predetermined distance and that the axis of an LF reception antenna coil 101a is parallel to the axis of the LF transmission antenna coil 301a. As described later, the installation target of the key unit 100 is not limited to the vehicle 10, and the key unit 100 may be installed in a predetermined facility. In this case, the locking and unlocking device 300 functions as a locking and unlocking device of the predetermined facility.

Figure 9:
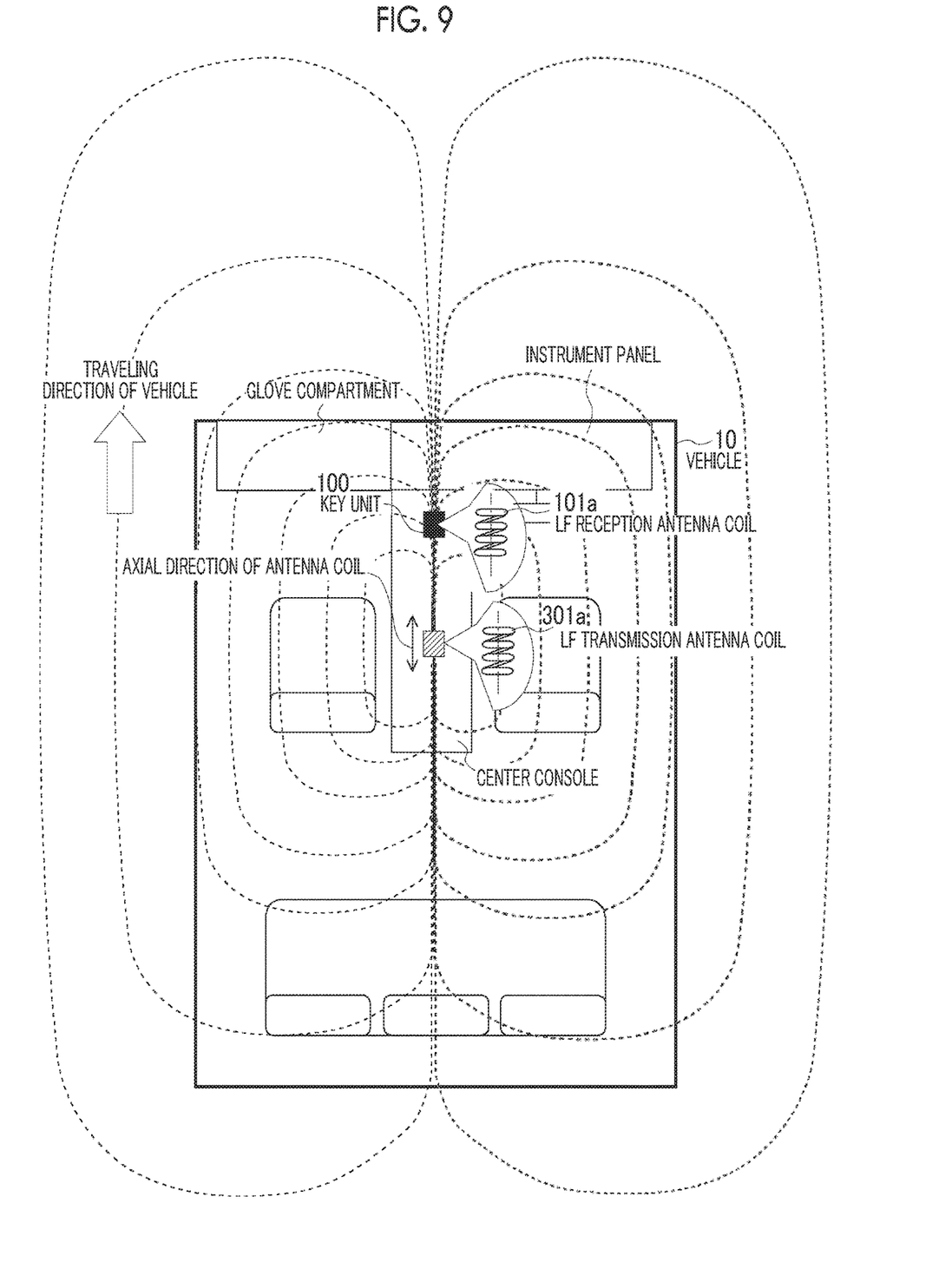
FIG. 9 is a first diagram showing an example of an installation aspect of an LF reception antenna coil.

The aspect in which the key unit 100 is installed in the vehicle cabin such that the axis of the LF reception antenna coil 101a is parallel to the axis of the LF transmission antenna coil 301a will be described. FIG. 9 is a diagram showing an example of an installation aspect of an LF reception antenna coil 101a in a case where the LF transmitter 301 is built in the center console and the axis of the LF transmission antenna coil 301a is oriented in a traveling direction of the vehicle 10 (hereinafter, the direction may be referred to as "longitudinal direction of the vehicle 10"). According to the installation aspect shown in FIG. 9, in the center console, the key unit 100 is installed such that the axis of the LF reception antenna coil 101a is in an orientation substantially matching the axis of the LF transmission antenna coil 301a. In the installation aspect as described above, as shown in FIG. 9, the radio waves transmitted from the LF transmission antenna coil 301a are easily incident on the axis of the LF reception antenna coil 101a. As described above, the field intensity of the radio waves incident on the axis of the LF reception antenna coil 101a from the LF transmission antenna coil 301a is relatively strong. That is, the reception intensity of the polling signal in the LF reception antenna coil 101a is increased as much as possible.

Figure 10:
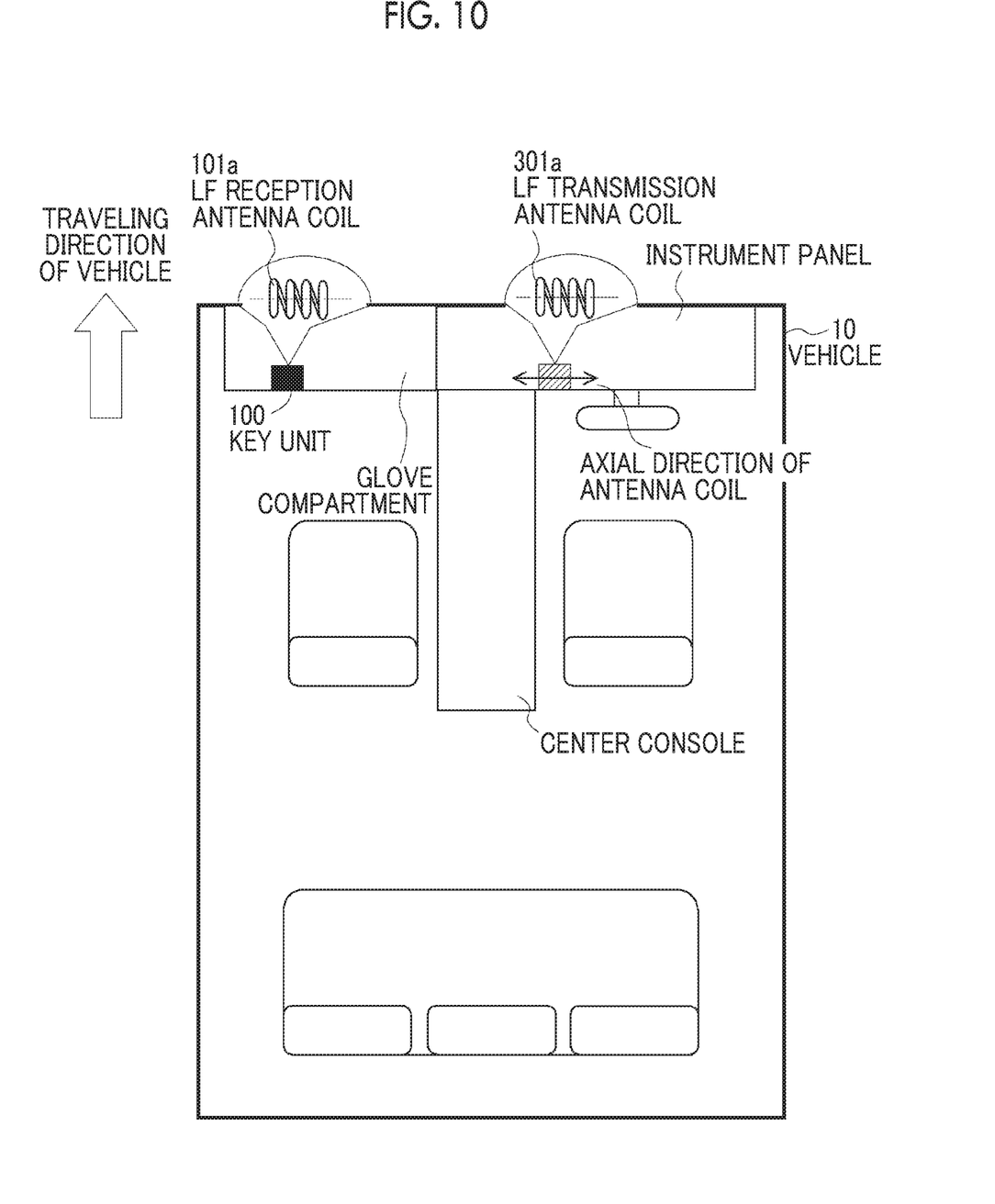
FIG. 10 is a second diagram showing an example of the installation aspect of the LF reception antenna coil.

FIG. 10 is a diagram showing an example of the installation aspect of the LF reception antenna coil 101a in a case where the LF transmitter 301 is built in the instrument panel and the axis of the LF transmission antenna coil 301a is oriented in a width direction of the vehicle 10. In the above described installation aspect as well, the radio waves of the relatively high intensity transmitted from the LF transmission antenna coil 301*a* is easily incident on the axis of the LF reception antenna coil 101*a*. Therefore, the reception intensity of the polling signal in the LF reception antenna coil 101*a* is increased as much as possible.

In FIGS. 9 and 10, the key unit 100 is installed such that the axis of the LF reception antenna coil 101*a* is in the orientation substantially matching the axis of the LF transmission antenna coil 301*a*, and there is no intention to limit the installation of the key unit 100. Any installation of the key unit 100 in which the axis of the LF reception antenna coil 101*a* is in an orientation parallel to the axis of the LF transmission antenna coil 301*a* may be applied. Therefore, also in a case where the LF transmitter 301 is built in the center console, in the orientation in which the axis of the LF reception antenna coil 101*a* is parallel to the axis of the LF transmission antenna coil 301*a*, the key unit 100 can be installed in a glove compartment, under a seat, on a ceiling or the like.

By installing the key unit 100 as described above, the intensity of the wireless communication between the key unit 100 and the locking and unlocking device 300, specifically, the intensity of the wireless communication between the LF receiver 101 of the key unit 100 and the LF transmitter 301 of the locking and unlocking device 300 can be increased as much as possible. Even in a case where the key unit 100 is installed in the vicinity of the noise sources such as the ETC (registered trademark) in-vehicle device, the air conditioner, the wiper, and the plasmacluster, signal-to-noise ratio when the when the LF receiver 101 receives the polling signal can be maintained relatively high, good wireless communication between the LF receiver 101 and the LF transmitter 301 can be realized.

In a case where the key unit 100 is installed in a position away from the noise source, better wireless communication can be realized. In this case, the key unit 100 is installed in the glove compartment, for example.

In the LF reception antenna coil 101*a* shown in FIGS. 9 and 10, the antenna coil has one axis. As described above, since the influence of the noise is suppressed as much as possible, better wireless communication between the LF receiver 101 and the LF transmitter 301 can be realized.

On the other hand, in the wireless communication system according to the first embodiment of the disclosure, there is no intention to limit the number of the axis of the LF reception antenna coil 101*a* to one, and the LF reception antenna coil 101*a* may have three axes. In a case where the LF reception antenna coil 101*a* has three axes as well, by installing the key unit 100 such that one of the axes of the antenna coil is parallel to the axis of the LF transmission antenna coil 301*a*, the intensity of the wireless communication between the LF receiver 101 and the LF transmitter 301 is increased as much as possible.

The key unit 100 includes a power supply circuit (not shown). The power supply circuit supplies power of a predetermined voltage to the LF receiver 101, the RF transmitter 102, the short-range communication unit 103, and the controller 104. Here, even when system power of the vehicle 10 is turned off, the key unit 100 is installed in a position where an uninterruptible power supply to the key unit 100 is possible. Then, even when the system power of the vehicle 10 is turned off, power is supplied to the key unit 100 from an auxiliary battery (not shown) mounted on the vehicle 10.

The key unit 100 is installed in a position (for example, in a glove compartment) where the key unit 100 can be appropriately fixed to the vehicle 10. As described above, the key unit 100 is fixed to the vehicle 10 even when the vehicle 10 is traveling or another device (for example, airbag) provided in the vehicle 10 is operating, and thus it is possible to protect occupants in the vehicle 10 and to reduce damage to the key unit 100.

In the description of the embodiment, the example in which the key unit 100 performs solely the locking and unlocking of the vehicle 10 is shown; however, the key unit 100 may be caused to perform an operation other than the locking and unlocking. For example, the key unit 100 may communicate with a control device that manages an engine so as to enable an engine start of the vehicle. According to such a configuration, an existing portable device (electronic key) possessed by the user can be replaced with the portable terminal.

In the description of the first embodiment, the description is made that the key unit 100 receives the polling signal transmitted via the radio waves in the LF band; however, the locking and unlocking signals may not be necessarily transmitted in response to the polling signal. By transmitting the key ID in response to the polling signal, it is possible to cause the locking and unlocking device 300 to recognize that the valid electronic key is inside the vehicle; however, the locking and unlocking signals may be just transmitted via the radio waves in the RF band.

Second Embodiment

The first embodiment is an example in which the key unit 100 is installed in the vehicle. In contrast to the above description, in the second embodiment, the key unit 100 is installed in a predetermined facility. At this time, the locking and unlocking device 300 functions as a locking and unlocking device of the predetermined facility, and the key unit 100 communicates with the locking and unlocking device 300 to command a locking and unlocking of the predetermined facility.

Also in the second embodiment, the wireless communication system can be defined as a system of the wireless communication performed between the locking and unlocking device 300 and the key unit 100 via the LF transmitter 301 and the LF receiver 101. Also in the wireless communication system as described above, the key unit 100 is installed in the predetermined facility such that the distance between the LF receiver 101 and the LF transmitter 301 is within a predetermined distance and that the axis of the LF reception antenna coil 101*a* is parallel to the axis of the LF transmission antenna coil 301*a*. As described above, it is possible to increase the intensity of the wireless communication between the LF receiver 101 and the LF transmitter 301 as much as possible.

The wireless communication system according to the second embodiment is not limited thereto, and can be defined as a system of the wireless communication performed between the locking and unlocking device 300 and the key unit 100 via the RF transmitter 102 and the RF receiver 302. In the wireless communication system as described above, the key unit 100 is installed in the predetermined facility such that the distance between the RF transmitter 102 and the RF receiver 302 is within a predetermined distance and that an axis of an antenna coil of the RF transmitter 102 is parallel to an axis of an antenna coil of the RF receiver 302. As described above, it is possible to increase the intensity of the wireless communication between the RF transmitter 102 and the RF receiver 302 as much as possible.

The embodiment is merely an example for implementing the disclosure. Therefore, the disclosure is not limited thereto, and may be appropriately modified and implemented within a range not departing from the scope of the disclosure described in the claims.

What is claimed is:

1. A wireless communication system comprising:
   a locking and unlocking device configured to control locking and unlocking of a target, the locking and unlocking device being installed in the target, the locking and unlocking device including a device-side communication module configured to communicate a first signal having a first frequency band, the device-side communication module having a device-side antenna coil for communication; and
   a key unit configured to communicate with the locking and unlocking device and to command the locking and unlocking of the target by communicating with the locking and unlocking device, the key unit being mounted in the target and including a unit-side communication module that communicates the first signal, the unit-side communication module having a unit-side antenna coil for communication,
   wherein the key unit is mounted in the target such that a distance between the unit-side communication module and the device-side communication module is within a predetermined distance at which communication between the unit-side communication module and the device-side communication module is possible and that an axis of the unit-side antenna coil is parallel to an axis of the device-side antenna coil.

2. The wireless communication system according to claim 1, wherein:
   the device-side communication module is a device-side transmission module configured to transmit the first signal to the key unit;
   the unit-side communication module is a unit-side reception module configured to receive the first signal;
   the key unit further includes a unit-side transmission module configured to transmit a second signal having a second frequency band that is a frequency band higher than the first frequency band to the locking and unlocking device;
   the locking and unlocking device further includes a device-side reception module which is configured to receive the second signal, and is mounted on a vehicle;
   the key unit is configured to transmit the second signal that commands the locking and unlocking of the vehicle from the unit-side transmission module when the unit-side reception module receives the first signal; and
   the locking and unlocking device is configured to control the locking and unlocking of the vehicle when the device-side reception module receives the second signal.

3. The wireless communication system according to claim 2, wherein the key unit is mounted in a vehicle cabin of the vehicle.

4. The wireless communication system according to claim 1, wherein the unit-side antenna coil has one axis.

5. The wireless communication system according to claim 2, wherein the locking and unlocking device is installed in an instrument panel of the vehicle.

6. The wireless communication system according to claim 2, wherein the key unit and the locking and unlocking device are installed in a center console of the vehicle.

7. The wireless communication system according to claim 2, wherein the key unit and the locking and unlocking device are installed in an instrument panel of the vehicle.

8. The wireless communication system according to claim 1, wherein the first frequency band is a long wave band.

9. The wireless communication system according to claim 1, wherein the locking and unlocking device is configured to control locking and unlocking of a door of the target.

* * * * *

UNITED STATES PATENT AND TRADEMARK OFFICE
CERTIFICATE OF CORRECTION

| | | |
|---|---|---|
| PATENT NO. | : 10,713,870 B2 | |
| APPLICATION NO. | : 16/134479 | |
| DATED | : July 14, 2020 | |
| INVENTOR(S) | : Yasuyuki Tamane, Tsukasa Takahashi and Masaki Oshima | |

It is certified that error appears in the above-identified patent and that said Letters Patent is hereby corrected as shown below:

On the Title Page

In item (72), inventor 1, city, delete "Miyoshi" and insert --Miyoshi-shi Aichi-ken--, therefor.

In item (72), inventor 2, city, delete "Tokyo" and insert --Chiyoda-ku Tokyo--, therefor.

In item (72), inventor 3, city, delete "Aichi-ken" and insert --Niwa-gun Aichi-ken--, therefor.

In the Specification

In Column 4, Line(s) 56, after "controller", delete "," and insert --;--, therefor.

In Column 8, Line(s) 43, delete "1D" and insert --ID--, therefor.

In Column 10, Line(s) 27, delete "1D" and insert --ID--, therefor.

In Column 13, Line(s) 33, delete "when the when the" and insert --when the--, therefor.

Signed and Sealed this
Tenth Day of November, 2020

Andrei Iancu
*Director of the United States Patent and Trademark Office*